Sept. 26, 1961 W. J. NELSON 3,001,394
ROAD SIMULATING APPARATUS FOR VIBRATION
TESTING OF MOTOR VEHICLES
Filed May 23, 1958
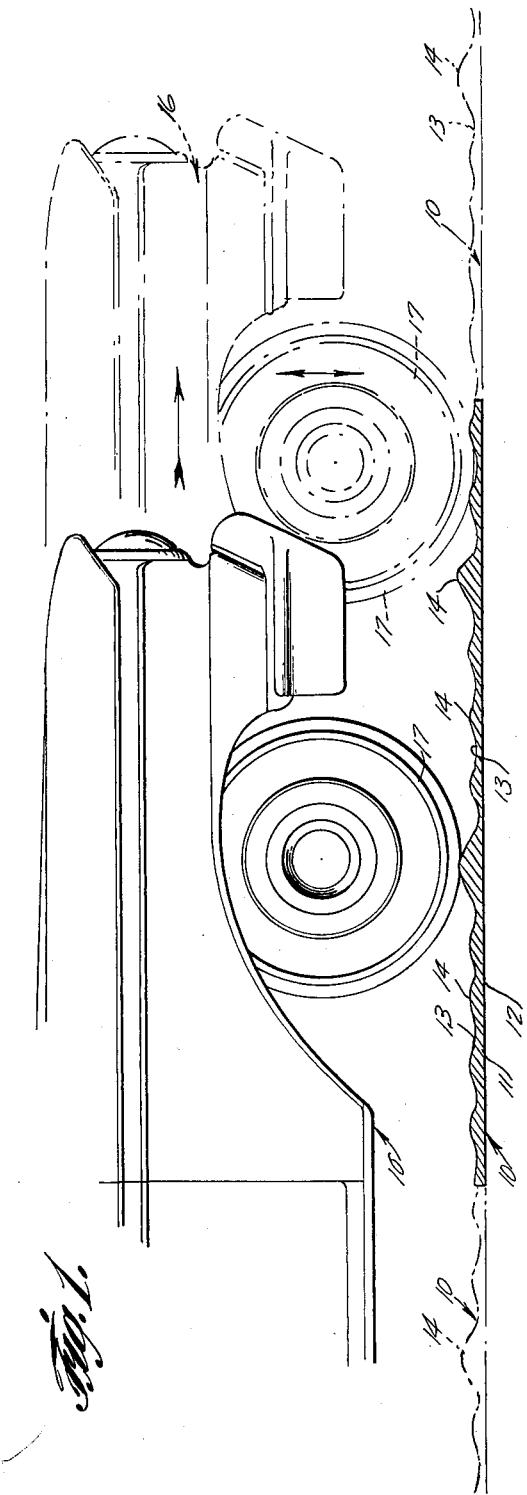
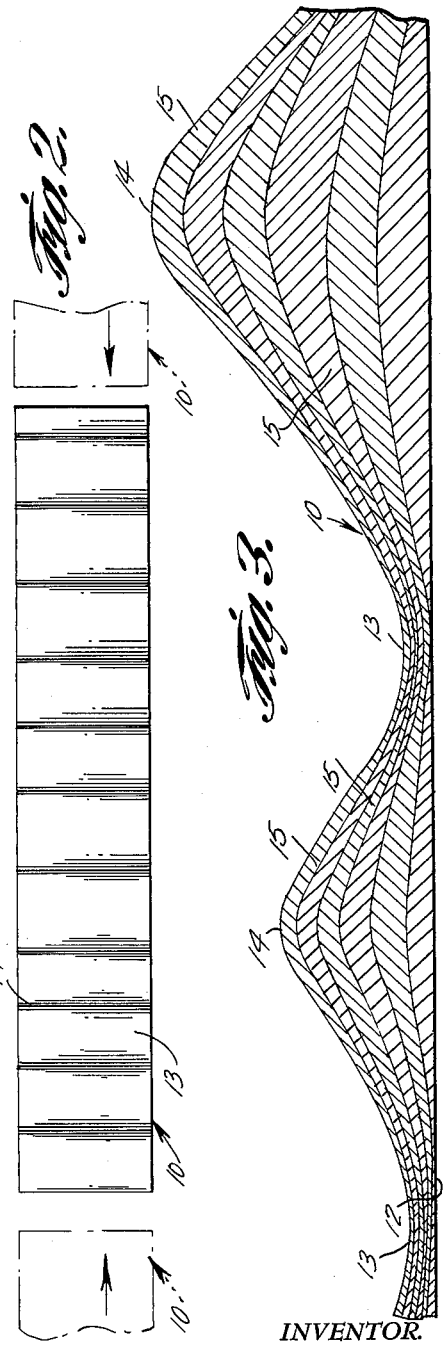
INVENTOR.
Walter J. Nelson
BY Victor J. Evans &Co.
ATTORNEYS 3,001,394
ROAD SIMULATING APPARATUS FOR VIBRATION TESTING OF MOTOR VEHICLES
Walter J. Nelson, 4809 23rd Place, Cicero, Ill.
Filed May 23, 1958, Ser. No. 737,411
4 Claims. (Cl. 73—71.7)

This invention relates to a device for use in simulating bad road conditions so that squeaks, rattles and the like in a vehicle such as an automobile can be readily located.

The object of the invention is to provide a device which is in the nature of a test lane whereby the device can be arranged in any suitable location such as in or adjacent to a garage so that by driving a vehicle over the test lane, the vehicle will be subjected to vibrations whereby any rattling or noises which are present in the vehicle will be observed or heard by the mechanic or other person so that the necessary corrective measures can be taken to eliminate such noises or rattling.

Another object of the invention is to provide a test lane which is fabricated of a suitable material such as rubber or tire cord, so that the device will not readily skid or move from its desired location, and wherein the test lane is provided with a plurality of corrugations or treads, whereby as an automobile or other vehicle is driven over the corrugations, the vehicle or automobile will be subjected to vibrations that will simulate bad road conditions so that various types of defects such as noises or rattles in a vehicle can be readily learned of so that such repairs as are necessary to overcome these defects can be conveniently carried out.

A further object of the invention is to provide a test lane which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is an elevational view illustrating the test lane of the present invention being used, and with parts broken away and in section.

FIGURE 2 is a plan view illustrating the test lane.

FIGURE 3 is a fragmentary sectional view on an enlarged scale showing a method of building up or forming a test lane by means of a plurality of superimposed layers of material.

Referring in detail to the drawings, the numeral 10 designates the test lane of the present invention, and the test lane is in the nature of a body member 11 which is made of a suitable material such as a suitable resilient material. The body member 11 includes a flat lower surface 12, and there is provided in the upper portion of the body member a plurality of recesses 13 which define therebetween treads or corrugations 14. As shown in FIGURE 3, the body member 11 may be made up by superimposing layers 15 of suitable material on top of each other and these layers can be bonded together so as to provide the completed test lane 10.

In FIGURE 1 the numeral 16 indicates a portion of a vehicle such as an automobile which has a wheel 17 adapted to be driven over the test lane 10.

From the foregoing, it is apparent that there has been provided a test lane which is especially suitable for use in simulating bad road conditions so that rattles, noises or other defects can be readily located or learned of whereby such defects or repairs can be readily taken care of. The test lane 10 is adapted to be made of any suitable material such as rubber or cord-like material, and the test lane may be made up by superimposing a plurality of layers such as the layers 15 and then these layers can be bonded together by means of a suitable adhesive or the like or else these layers can be vulcanized together. It is to be noted that the lower surface 12 of the test lane is flat so that it will lie flat on a floor surface or road surface such as the floor of a garage or pavement. The recesses 13 in the upper portion of the test lane define therebetween a plurality of treads or corrugations 14 which have a somewhat rounded formation as shown in FIGURES 1 and 3. When making the test lane, the recesses 13 and tread 14 are made so that they are in different sizes or shapes. Thus, with the test lane 10 in position on a roadway or floor, it will be seen that a vehicle such as the vehicle 16 can be driven over the test lane whereby when the wheels 17 ride over the corrugations 14, the wheels 17 will bounce up and down so as to set-up vibrations in the vehicle. These vibrations will permit a mechanic or owner or driver of the vehicle to readily listen to or observe or locate any defects such as rattles, noises or the like which may be present in the vehicle whereby said defects can be readily repaired. In other words the test lane provides a means of simulating bad road conditions so that it is not necessary for the vehicle to be driven at high speeds over great distances which may be far away in order to locate such defects or troubles in the vehicle since the test lane permits the defects to be located while the vehicle is in a garage or other convenient location.

As shown in FIGURES 1 and 2 for example, a plurality of the test lanes 10 can be used as desired and these test lanes 10 may be arranged in alignment with respect to each other, or else they can be arranged in an offset manner so as to further increase the vibrations which are set-up in the vehicle. The corrugations 14 are of different sizes or elevations so that as the vehicle travels along the device, the desired vibrations will be set-up in the wheel and vehicle.

The device can be made of any suitable material and in different shapes or sizes.

If desired, each test lane may be 12" wide and 6' long and each lane or unit may contain nine 1" treads and two 2" treads. For ideal testing, a total of twelve units or lanes are recommended.

The boulevard type lane of the present invention consists of a treaded vulcanized rubber rattle test lane which is adapted to be provided in 6' lengths and these lanes are adapted to be used in offset parallel relationship so as to simulate the worst road conditions likely to be encountered in normal driving. The object of the lane is to bring out all squeaks, rattles and undesirable noises which are present in an automobile with a minimum of test driving. The base may be six-ply cord and its construction may be similar to that of a tire.

The boulevard test lane is safe since it permits an inside test away from traffic and this will be reflected not only in customer appreciation but also by insurance underwriters who may well reflect appreciation by means of lower rates. Furthermore, the test lane permits noise to be diagnosed quickly since it can be accomplished with the customer in the automobile so that it can be made plain to the customer just what noise is present, and wherein the customer can make it plain just what noise he or she wishes to have eliminated. The device is portable so that it can be moved from place to place as desired or it can be used right on the floor of a garage. The rubber base adhere to concrete. The device is economical both from the standpoint of the customer and the garage since the automobile has only to be driven a short distance over the test lane to thereby save gas, wear and tear as well as the time of the mechanic.

Minor changes in shape, size and rearrangement of details coming within the field of invention claimed may be resorted to in actual practice, if desired.

I claim:

1. A road simulating apparatus for motor vehicles comprising a body member fabricated of laminated layers of resilient material, said body member having a flat lower surface that is positioned in contactual relation to a ground surface, said body member having a plurality of raised portions in its upper surface at points spaced longitudinally of the body, said raised portions being formed by each of the layers being of increased thickness, thereby defining between such points a plurality of recesses.

2. A road simulating apparatus for motor vehicles as in claim 1 wherien said raised portions are of irregular formation and said recesses are of irregular formation whereby the raised portions defining said recesses are irregularly spaced.

3. A road simulating apparatus for motor vehicles as in claim 2 wherein said raised portions and said recesses each have a longitudinal axis extending perpendicular to the longitudinal axis of said body member.

4. A road simulating apparatus for motor vehicles comprising a body member fabricated of laminated layers of resilient material, said body member having a flat lower surface that is positioned in contactual relation to a ground surface, said body member having a plurality of raised portions in its upper surface at points spaced longitudinally of the body, said raised portions being formed by each of the layers being of increased thickness, thereby defining between such points a plurality of recesses, said recesses and said raised portions each having a longitudinal axis extending perpendicular to the longitudinal axis of said body member, said recesses and said raised portions being of different shapes and sizes whereby when a vehicle wheel travels over said body the vehicle will be subjected to simulated bad road conditions.

References Cited in the file of this patent

UNITED STATES PATENTS

| | | |
|---|---|---|
| 1,464,763 | Isenberg | Aug. 14, 1923 |
| 1,722,069 | Widney | July 23, 1929 |

FOREIGN PATENTS

| | | |
|---|---|---|
| 115,187 | Australia | June 4, 1942 |